United States Patent Office 3,466,421
Patented Sept. 9, 1969

3,466,421
RAIL-TYPE APPARATUS FOR ELECTRO-SLAG WELDING OF METAL
Mikhail Gershovich Belfor, Pereulok Chekistov 11/12, kv. 28, and Jury Ivanovich Saprykin, Novo-Zhelyanskaya ulitsa 4, kv. 3, both of Kiev, U.S.S.R.
Filed Aug. 11, 1965, Ser. No. 478,976
Int. Cl. B23k 9/12
U.S. Cl. 219—126                            4 Claims

ABSTRACT OF THE DISCLOSURE

An apparatus for the electro-slag welding of metal in which an undercarriage is located for movement along a rail column, and at least one welding head having mouth pieces for feeding a welding wire and supplying current thereto disposed on both sides of the head is rotatably mounted on the undercarriage. The welding head is capable of turning around a vertical axis parallel to the column so it is possible to weld joints located at the right or left side of the column.

---

The present invention relates to rail-type apparatus movable along a rail mounted parallel to the edges of a workpiece to be welded, and is particularly intended for the electro-slag welding of metal.

The apparatus may be applied for the electro-slag welding of longitudinal and circular welds in angle, T, and T-butt joints.

Known in the art are rail-type apparatus, comprising an undercarriage travelling along a rail column, with the undercarriage mounting a one- or multiple-electrode welding head, provided with mouthpieces for feeding the welding wire into the welding zone and for supplying welding current thereto, a device for maintaining the molten bath, and a device for moving the welding head along the molten bath.

Such apparatus, being provided with non-rotating welding heads, cannot be applied for welding angle, T, and T-butt joints. In addition, the said apparatus may be applied for welding joints disposed only on the right or on the left side of the apparatus depending on its design.

In multiple-electrode welding heads, the mouthpieces for feeding the welding wire into the welding zone are connected to different phases of the current source which considerably decreases the reliability of the apparatus for the electro-slag welding on account of a possible rupture of the electric insulation of the mouthpieces.

Moreover, the known apparatus do not allow the rapid positioning and drawing off of a slide to let off the welding slag. Also, the operation of shifting the zone of oscillations of welding electrodes is made more difficult, and the positioning of a long rail track parallel to a workpiece to be welded is complicated.

An object of the present invention is to provide an apparatus which allows, without an undue complication of its design, the welding of butt, T, and T-butt joints, disposed on the right and on the left side of the apparatus.

Another object of the present invention is to provide such an apparatus which ensures a rapid positioning of slides at the beginning of the welding operation and their rapid drawing off to let off the welding slag at the end of the welding procedure.

Yet another object of the present invention is to provide an apparatus which permits a simple and reliable control of the factors determining the oscillatory movement of the welding electrodes.

A further object of the present invention is to provide an apparatus which ensures a reliable operation of the mouthpieces.

In conformity with the above and other objects of the invention, the present apparatus for the electro-slag welding of metal, comprises at least one welding head travelling along a rail column, the welding head being provided with means to feed the welding wire into the welding zone and to supply welding current thereto as well as a device for shifting the welding head along the molten bath.

According to the present invention, the welding head is provided with fixtures for clamping the mouthpieces on two opposite sides, being designed in a manner to be rotatably mounted, which provides for welding joints disposed on both sides of a rail, with a device for moving the welding head along the molten bath being provided with a mechanism for shifting the zone of oscillations of the welding wire.

To weld angle, T, and T-butt joints in metal, it is expedient to provide bent mouthpieces for feeding the welding wire into the welding zone.

A favorable solution is achieved due to the fact that the mechanism for shifting the zone of oscillations of the welding wire is provided with a floating screw co-acting with limit switches, and with a nut co-acting with rests of the welding head.

These and other objects and advantages of the present invention will become more fully apparent from a consideration of the following description thereof, taken in conjunction with the appended drawings, in which.

Figure 1:
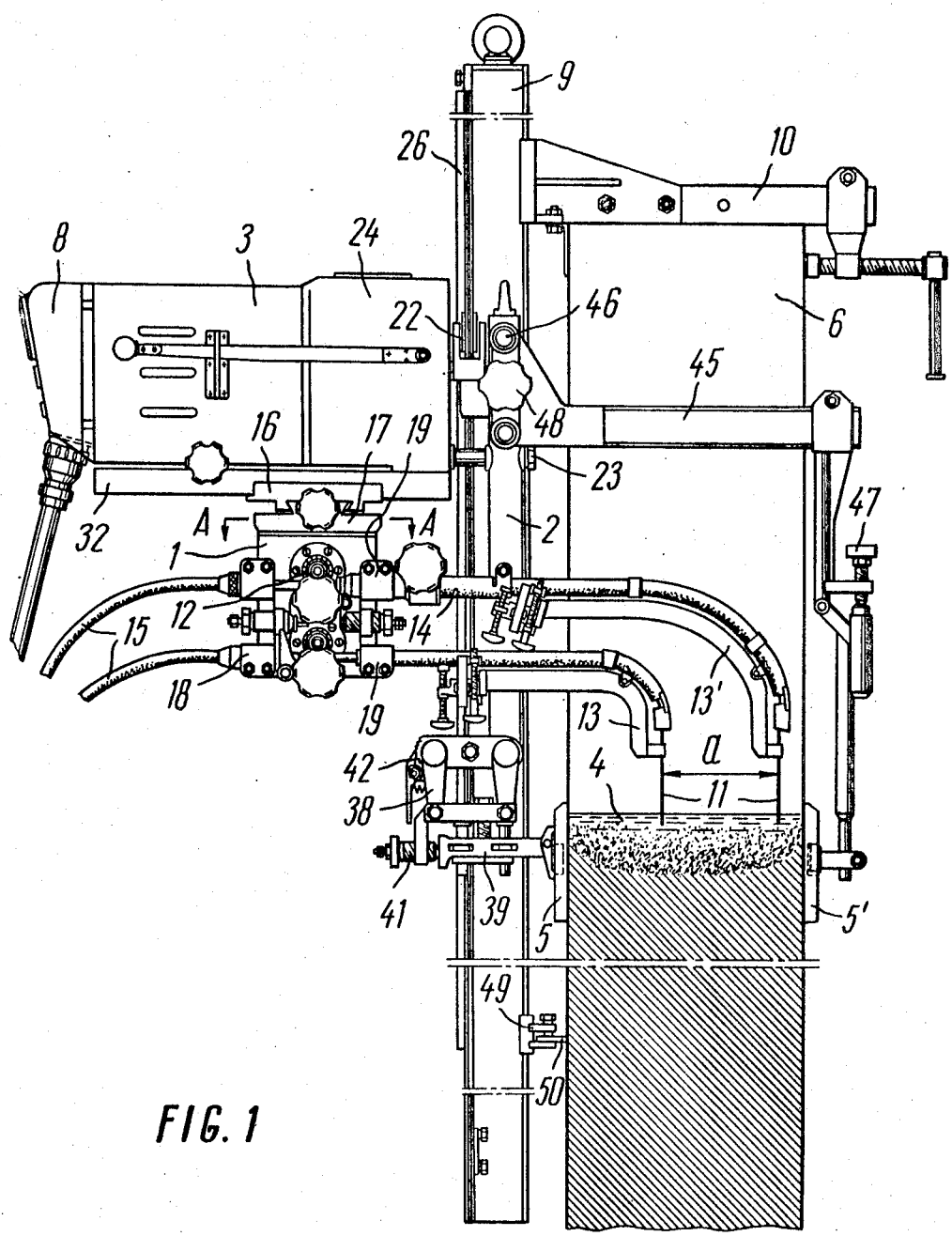
FIG. 1 is a front elevational view of exemplary embodiment of an apparatus for electro-slag welding according to the present invention.

The rail-type apparatus for the electro-slag welding of metal comprises a two-electrode welding head 1 (FIGS. 1, 2), mounted on an undercarriage 2 by means of a bracket 3, and a device for maintaining a molten bath 4 and for the positive shaping of a weld. The device comprises two slides 5 and $5^1$ complete with appliances for pressing the slides against workpieces 6 and 7 to be welded, a control board 8, and a rail column 9 provided with a screw clamp 10.

The welding head 1 feeds two welding wires 11 into the welding zone by means of two pairs of rollers 12 via current-supplying and feeding mouthpieces 13 and $13^1$. One of the mouthpieces $13^1$ is mounted on an extensible bar 14 permitting the distance "$a$" between the welding wires 11 to be varied. Receiving hoses 15 are employed to direct the welding wires 11 to the rollers 12.

The mouthpieces 13 and $13^1$ and the rollers 12 are not electrically insulated one from another, which considerably simplifies the design of the apparatus and insures the reliability of its operation.

The welding head 1 is mounted on the undercarriage 2 travelling along the rail column 9, and is suspended on a support 16 by means of a flange 17 in such a manner that it can be fixed in various positions when turning about an axis extending parallel to the rail track. The working side of the welding head is provided with two pairs of fixtures 18 and 19 for clamping the mouthpiece 13 and the extensible bar 14 with the mouthpiece $13^1$ or the receiving hoses 15, respectively.

Figure 3:
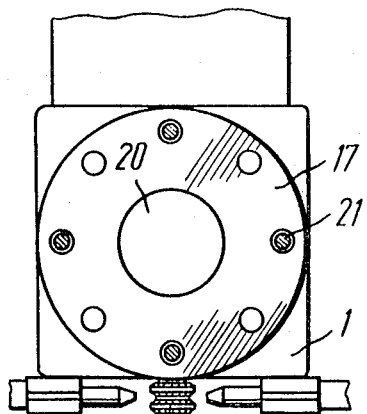
FIG. 3 is a view of the apparatus taken along the line A—A of FIG. 1.
Figure 4A:
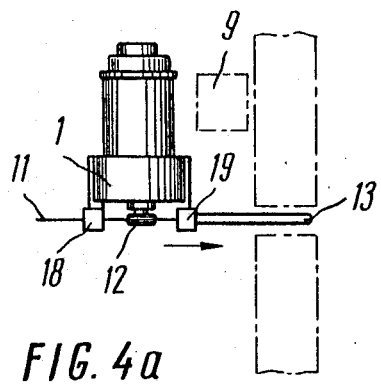
FIGS. 4a and 4b are elevational views showing a welding head adjusted for feeding the welding wire from the left to the right and vice versa, with ordinary mouthpieces being mounted thereon.
Figure 4B:
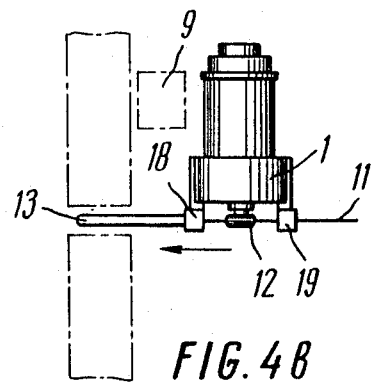

The possibility of turning of the welding head 1 on the flange 17 about axis 20 when unscrewing bolts 21 (FIG. 3) allows the mouthpieces 13 and $13^1$ to be arranged on the right or the left side of the apparatus.

Figure 5A:
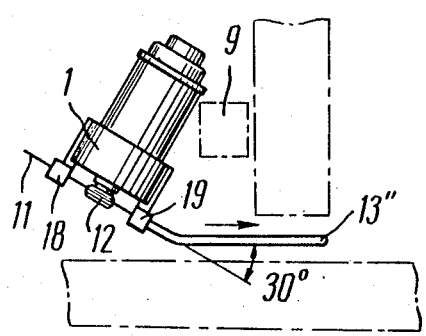
FIGS. 5a and 5b are views similar to FIGS. 4a and 4b with bent mouthpieces.
Figure 5B:
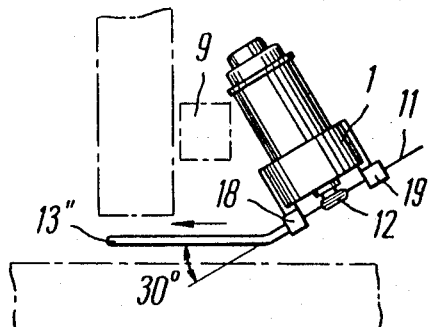

The symmetrical arrangement of the feeding rollers 12 and fixtures 18 and 19 in relation to the vertical axis of the welding head and the possibility of reversing the motor allow the feeding of the welding wire from the left to the right or vice versa (FIGS. 4a, 4b, 5a, 5b) when welding joints disposed correspondingly on the right or on the left side of the rail column 9. The welding of angle T and T-butt joints is effected with mouthpieces $13^{11}$ bent in the horizontal plane (FIGS. 5a, 5b), and preferably at an angle of 30°.

Figure 6:
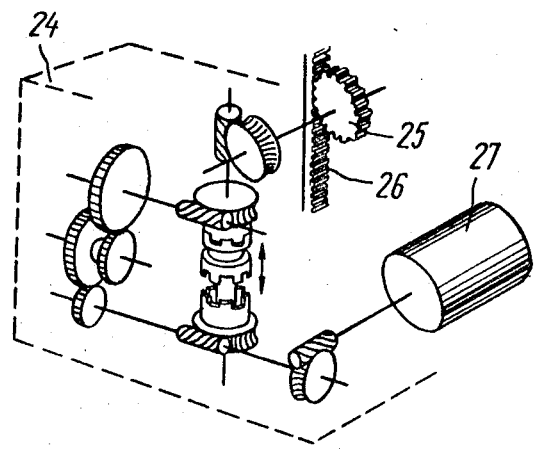
FIG. 6 is a diagrammatic view of a mechanism for the vertical shifting of the apparatus.

The welding head can be moved in the vertical direction by means of the undercarriage 2 (FIG. 1) which is a tubular structure provided with rollers 22. The undercarriage 2 is connected by means of bolts 23 with a reducing gear 24, whose drive gear 25 (FIG. 6) meshes with a toothed rack 26 of the rail column 9 (FIG. 1). The mechanism for the vertical travel of the apparatus (FIG. 6) is provided with a direct-current motor 27 whose revolutions per minute can be regulated.

Figure 7:
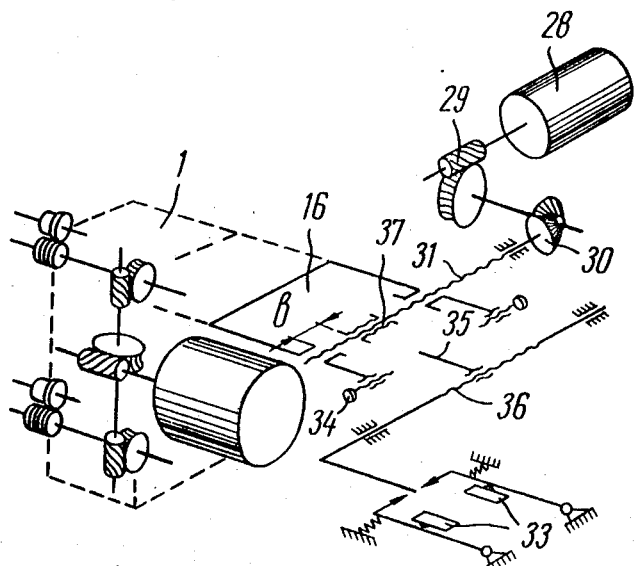
FIG. 7 is a diagrammatic view of a mechanism for the oscillation of welding electrodes and for shifting the zone of oscillations of the welding electrodes of a device for moving the welding head along the molted bath.

The housing of the reducing gear 24 accommodates the mechanism for oscillating the electrodes, and the mechanism is provided with a reversible motor 28, a worm gear assembly 29, a bevel gear 30 and a guide screw 31 (FIG. 7). The support 16 together with the welding head 1, when moving along a guide 32 (FIG. 1), causes the welding wires 11 to reciprocate along the molten bath.

The motor 28 is reversed by means of limit switches 33 (FIG. 7) receiving the pressure from rests 34 co-acting with a nut 35 and a floating screw 36. The extreme points of the oscillations of the welding wire (electrodes) 11 can be controlled by adjusting the position of the rests 34. When reversing the motor 28, the support 16 is immobile in the extreme points, while nut 37 is screwed down to an extent defined by a clearance "b." This insures that the zone of oscillations of the electrodes 11 will remain within the specified limits.

Figure 2:
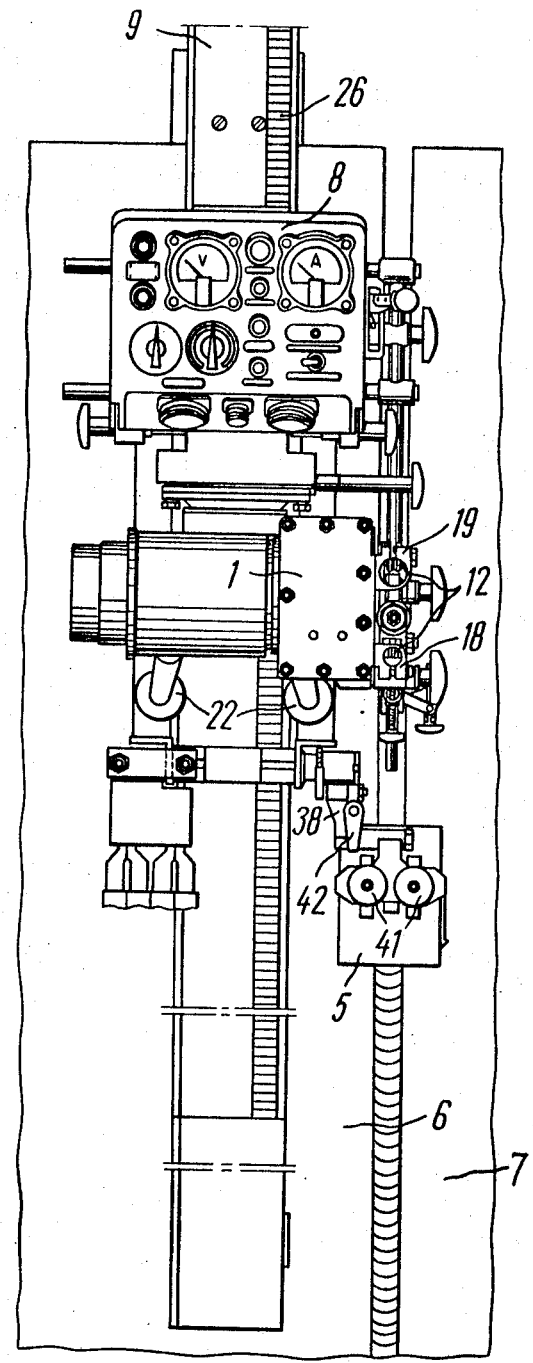
FIG. 2 is a side elevational view of the apparatus shown in FIG. 1 with the top of column 9 omitted at the break.

The turning of the floating screw 36 causes the oscillation zone of electrodes 11 to vary, without changing the amplitude of the oscillations, thus balancing the deviation from the parallel alignment between the rail column 9 and the plane of the workpieces 6 and 7 to be welded (FIGS. 1, 2).

Figure 8:
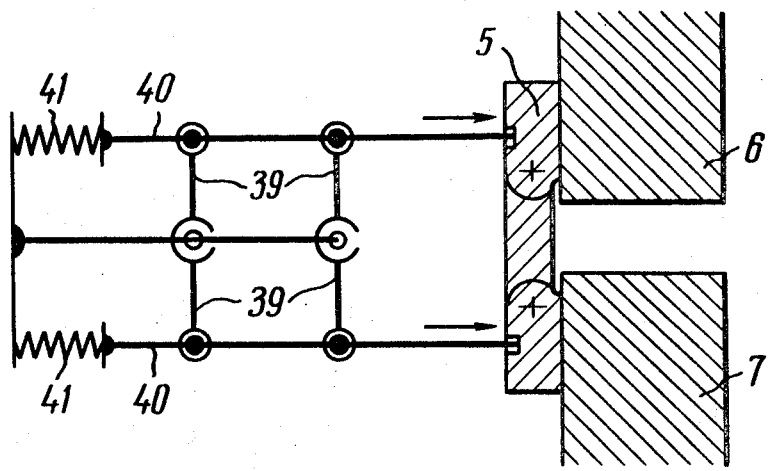
FIG. 8 is a diagrammatic view of a lever mechanism for pressing the slide to workpieces when a butt joint is to be welded.

The device for maintaining the molten bath and for the positive shaping of the welded joint comprises the two slides 5 and $5^1$ (FIG. 1) complete with appliances for pressing the slides against the workpieces to be welded. The appliance for pressing the slide 5 against the workpieces to be welded is composed of two lever mechanisms mounted on the undercarriage 2. Levers 38 of one mechanism are capable of oscillating vertically, while levers 39 of the other mechanism oscillate in the horizontal plane. The levers 39 affect the slide 5 by means of knives 40 articulated to the levers, with the knives being pressed by springs 41 (FIG. 8). Hence, the slide 5 is securely pressed against the workpieces being welded.

The position of levers 38 is fixed with a ratchet 42 (FIG. 1) which allows the rapid setting and pressing of the slide, and also the rapid drawing off thereof so as to let off the welding slag 4. The slide 5 may be made in different shapes according to the type of joints to be welded.

Figure 9:
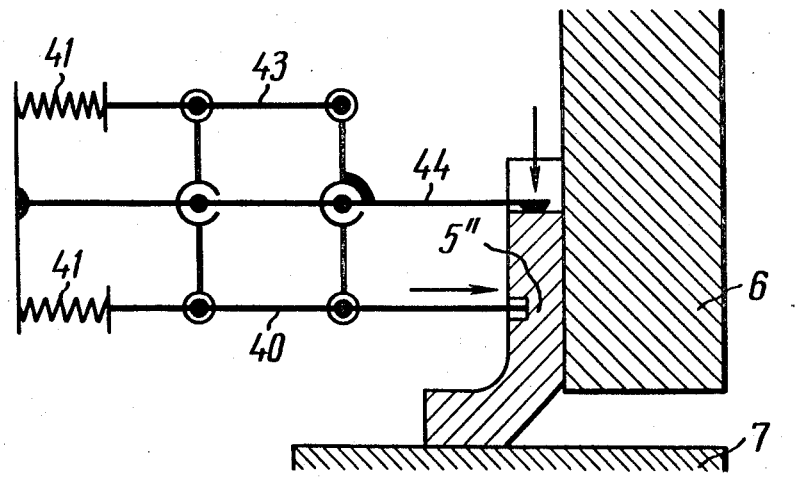
FIG. 9 is a view similar to FIG. 8 when welding an angle joint.

For example, when welding angle T and T-butt joints, slide $5^{11}$ should be used (FIG. 9). Then one of the knives 40 is replaced with a knife 43 and an angle piece 44. This enables the slide $5^{11}$ to be securely pressed against the workpieces to be welded.

The appliance for pressing the slide $5^1$ against the workpieces to be welded is essentially a lever mechanism mounted on the undercarriage 2 by means of a plate bracket 45 and pins 46 (FIG. 1). The lever mechanism, by means of a screw 47 presses the slide $5^1$ against the workpieces to be welded. The position of the plate bracket 45 in the gap between the edges of a workpiece to be welded can be adjusted by means of an adjusting device 48.

The rail column 9 is fixed to the workpiece to be welded by means of one or two screw clamps 10, moving along the column, or by means of screw clamps 49 that are also shifted along the rail column 9 and fixed on plates 50 welded to the workpiece being welded.

This invention is not to be confined to any strict conformity to the showings in the drawings but changes or modifications may be made therein so long as such changes or modifications mark no material departure from the spirit and scope of the appended claims.

What is claimed is:

1. A rail-type apparatus for electro-slag welding, comprising a rail column, an undercarriage mounted for movement along said rail column, at least one welding head, mouthpieces for feeding a welding wire and supplying current thereto secured on both sides of said welding head, means rotatably mounting said welding head on said undercarriage for rotation around a vertical axis parallel to the column so it is possible to weld joints located at the right or left side of the rail column, a device mounted on said undercarriage for moving said welding head along a weld line forming a molten bath, and said last named device comprising a mechanism for shifting the zone of oscillation of the welding wire.

2. The rail-type apparatus for the electro-slag welding of metal as claimed in claim 1 including means mounted on said undercarriage for containing the molten bath as it is formed along the weld line and positively shaping the weld.

3. The rail-type apparatus for the electro-slag welding of a metal as claimed in claim 2 in which said mouthpieces each have a bent configuration for use when welding angle T and T-butt joints, and said last named means comprises a slide, two lever mechanisms mounted on said undercarriage, one of said mechanism including two spring loaded knives operably related to said slide for pressing said slide against the workpieces to be welded, and the other of said mechanisms being a ratchet retaining said knives in the required position.

4. The rail-type apparatus for the electro-slag welding of metal as claimed in claim 1 in which said mechanism for shifting the zone of oscillations of the welding wire includes a floating screw, limit switches, with which said screw co-acts, a nut, and rests for the welding head with which said nut co-acts.

References Cited

UNITED STATES PATENTS

| 3,108,176 | 10/1963 | Simon | 219—74 |
| 3,128,368 | 4/1964 | Franz et al. | 219—125 |
| 3,170,430 | 2/1965 | Bistak | 219—126 X |
| 3,204,082 | 8/1965 | Dudko et al. | 219—126 |

JOSEPH V. TRUHE, Primary Examiner

J. G. SMITH, Assistant Examiner

U.S. Cl. X.R.

219—73